Figure 4:
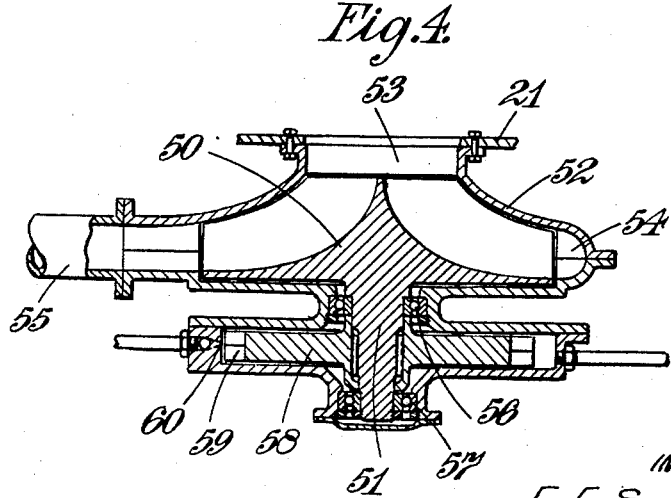

April 19, 1960
F. E. S. SMEDLEY ET AL
2,932,946
FUEL SYSTEM FOR GAS TURBINE ENGINE INCLUDING
HYDRAULICALLY DRIVEN AUXILIARY PUMP
Filed May 4, 1953
3 Sheets-Sheet 1
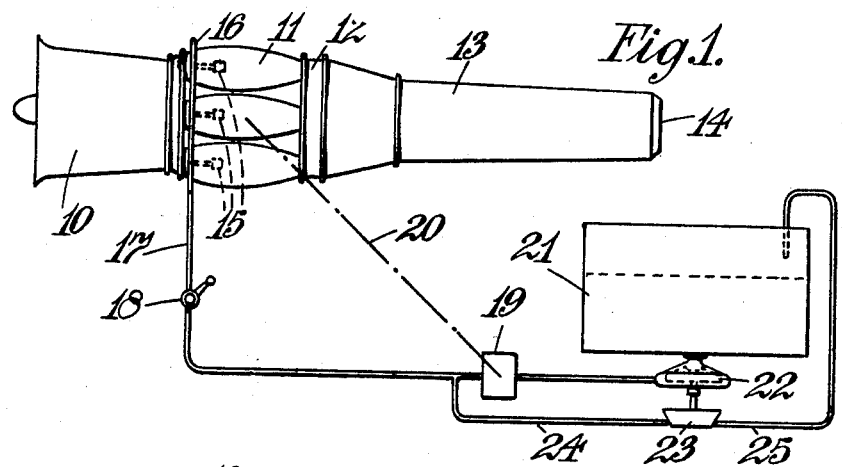
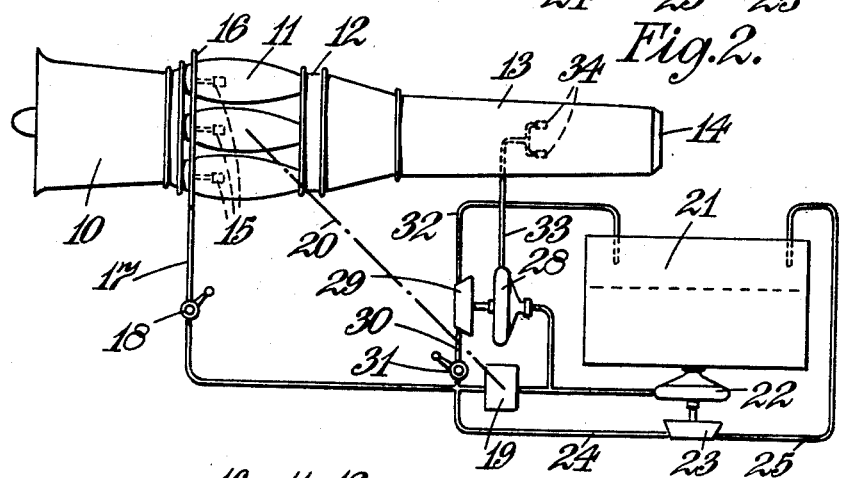
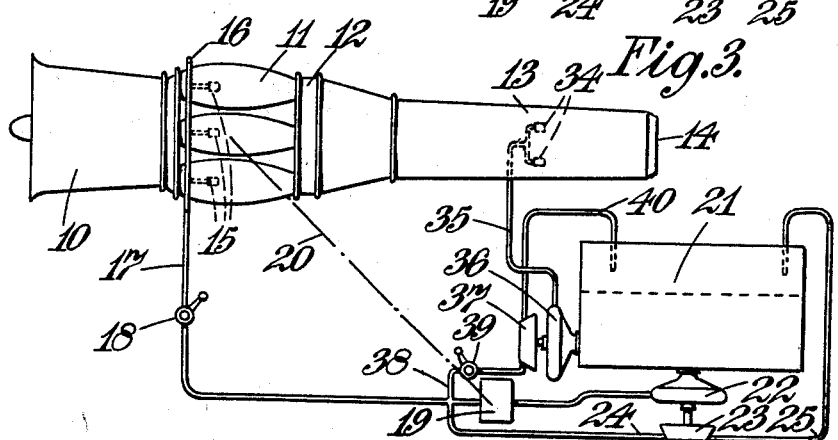
INVENTORS
F. E. S. SMEDLEY &
C. F. SEYMOUR
BY Wilkinson & Mawhinney
ATTYS.

April 19, 1960    F. E. S. SMEDLEY ET AL    2,932,946
FUEL SYSTEM FOR GAS TURBINE ENGINE INCLUDING
HYDRAULICALLY DRIVEN AUXILIARY PUMP
Filed May 4, 1953    3 Sheets-Sheet 2

INVENTORS
F. E. S. SMEDLEY &
C. F. SEYMOUR
BY Wilkinson & Mawhinney
ATTYS.

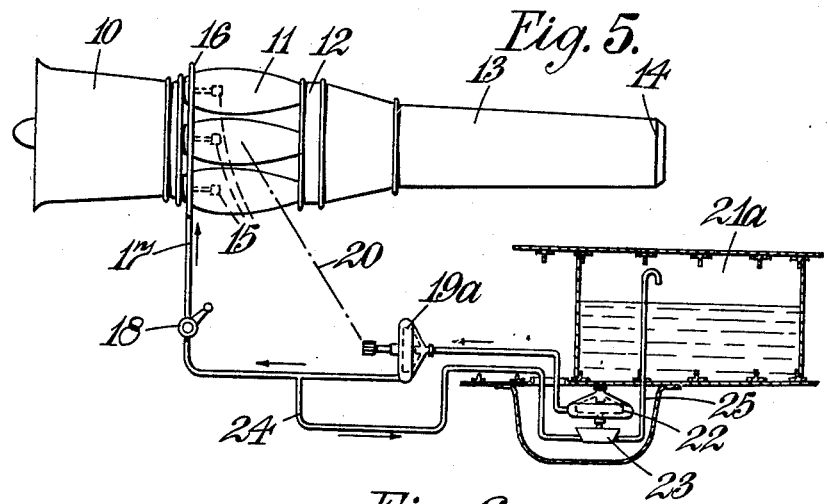
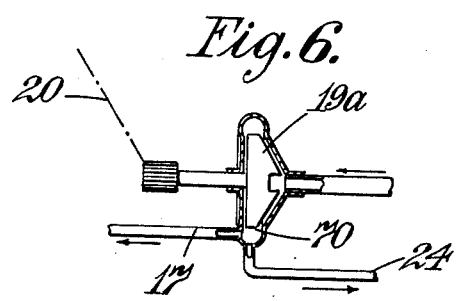
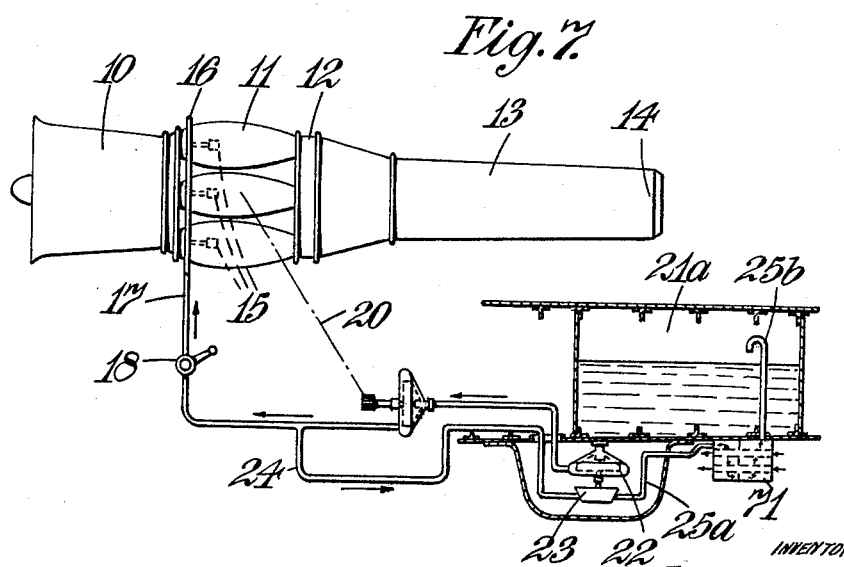

United States Patent Office 2,932,946
Patented Apr. 19, 1960

2,932,946

FUEL SYSTEM FOR GAS TURBINE ENGINE INCLUDING HYDRAULICALLY DRIVEN AUXILIARY PUMP

Frederick Edward Samuel Smedley, Beeston, England, and Cyril Frederick Seymour, Broughty Ferry, Dundee, Scotland, assignors to Rolls-Royce Limited, Derby, England, a British company Application May 4, 1953, Serial No. 352,726

Claims priority, application Great Britain May 20, 1952

7 Claims. (Cl. 60—39.28)

This invention relates to gas-turbine engine fuel systems and includes such systems when installed in aircraft for the purpose of effecting a main or auxiliary supply of fuel. It will be understood that the term "fuel" as employed herein includes (where the context permits) additional liquids, such as water-methanol, which are sometimes injected into the working fluid of the engine in operation.

A gas turbine engine usually comprises a compressor, a turbine which drives the compressor, and combustion equipment to which air is delivered by the compressor and in which a combustible liquid fuel is burnt, the products of combustion passing to the turbine to operate it. This fuel is supplied by a fuel system, hereinafter referred to as the "main fuel supply system," including a main liquid fuel pressurising pump, and in some arrangements it is desirable to provide a low-pressure pump to draw off the fuel from a fuel storage tank and to deliver the fuel to the inlet of the main fuel pressurising pump; such a low-pressure fuel pump is for convenience referred to hereinafter as a "booster pump."

In some engines, there is provided in addition to a main fuel supply system as just set forth, an additional liquid fuel supply system which may be required for special purposes during the operation of the engine. For example, in the case of a gas turbine engine employed for propelling an aircraft by reaction propulsion, a combustible fuel may be burnt in the exhaust duct to augment the propulsive thrust developed from the exhaust gases from the turbine; in general the fuel fed to the exhaust duct will be the same as that delivered by the main fuel supply system. In another example, in some aircraft gas turbine engines, an additional liquid, that is a liquid differing from that handled by the main fuel supply system, is delivered to the compressor system of the engine, for example for the purpose of increasing the mass flow through the engine; one suitable additional liquid for such a purpose comprises a mixture of water and methanol. In yet another example, in compound gas turbine engines, that is engines having two or more compressors each driven by an associated turbine, reheat combustion equipment may be provided for reheating the working medium after it has left one turbine but before it enters another turbine; in such reheat combustion equipment the fuel will normally be the same as that handled by the main fuel supply system. Fuel supply systems for delivery of an additional fuel to the engine, of which examples are given above, are hereinafter referred to as "auxiliary fuel supply systems," and such a fuel system will include a fuel pressurising pump.

Hitherto booster pumps and fuel pressurising pumps of auxiliary fuel supply systems have been driven either by electric motors or by air motors supplied with compressed air tapped from the compressor system of the engine. These arrangements are subject to disadvantages when employed in some installations; for example, for high rates of fuel flow, the weight of electrical equipment required including a generator and a motor may be excessive, and air motors, particularly those of the turbine kind, may overspeed unless safety provisions are made.

It is one object of the present invention to provide improved means for driving a booster pump, or a fuel pressurising pump of an auxiliary fuel supply system, or both.

According to the present invention in one aspect, a gas-turbine engine fuel supply arrangement having a main fuel-pressurising pump, and at least one other fuel pump, that is a booster pump or an auxiliary fuel supply system fuel-pressurising pump or both a booster pump and an auxiliary fuel supply system fuel-pressurising pump, includes means for tapping off fuel delivered by said main fuel-pressurising pump and delivering fuel so tapped-off to one or more hydraulic motors arranged to drive said booster pump or said fuel-pressurising pump or both.

The hydraulic motor may be of the turbine or Pelton wheel kind or may be of the positive displacement type such as a gear or sliding vane motor.

According to a feature of this aspect of the invention, the hydraulic motor or motors may be accommodated within a fuel storage tank or a casing in communication with the fuel tank, thereby to avoid the need for gland structures for the shaft connecting a hydraulic motor with a booster pump or auxiliary fuel supply system fuel-pressurising pump.

The arrangements in accordance with the present invention utilising a hydraulic motor supplied with fuel tapped from the delivery side of a main fuel-pressurising pump avoid these difficulties and have advantage from the point of view of weight and simplicity of design.

Conveniently, in any arrangement the fuel exhausting from a hydraulic motor is returned to the fuel storage tank.

The main fuel pressurising pump may be of any convenient kind, for instance a positive-displacement pump or a centrifugal pressurising pump.

According to this invention in another aspect a gas turbine engine fuel supply arrangement has as the main fuel-pressurising pump a centrifugal pump dimensioned and arranged to pass a quantity of fuel in excess of that delivered to the main combustion equipment of the engine, and means to tap off fuel from the delivery side of the centrifugal pump and return it through a conduit to heat exchanger means wherein cooling of the fuel occurs, there being means to prevent free flow of fuel in the conduit whereby part only of the fuel delivered by the centrifugal pump is delivered to the main combustion equipment and the remainder is conveyed to the heat exchanger means.

The means preventing free flow in the conduit may be a hydraulic motor connected to drive a booster pump or a fuel-pressurising pump of an auxiliary fuel supply system or both. Where the spill fuel tapped off from the delivery of the centrifugal main fuel pressurising pump is led back to a fuel tank, the tapped-off fuel may also be led through a fuel cooler prior to being delivered back into the tank.

The arrangement in accordance with this aspect of the invention avoids under certain operating conditions excessive heating of the fuel due to recirculation in the centrifugal pump and consequent boiling of the fuel in the delivery pipeline, and also allows the spill flow to be controlled in a simple and convenient manner.

Some embodiments of the invention are diagrammatically illustrated in the accompanying drawings in which:

Figure 1 shows a gas-turbine engine with a fuel system having a booster pump driven by an arrangement in accordance with the invention, Figure 2 shows a gas-turbine engine with fuel systems in which a booster pump pressurises the inlets of a main fuel pump and of a fuel pressurising pump of an auxiliary fuel system, both the booster pump and the fuel pump of the auxiliary fuel system being driven by arrangements in accordance with the invention, Figure 3 shows a gas-turbine engine with fuel systems similar to those shown in Figure 2 but in which the fuel pressurising pump of an auxiliary fuel system is independent of the booster pump, both pumps being driven by arrangements in accordance with the invention, Figure 4 is a diagrammatic view showing a hydraulic motor of the Pelton wheel kind with the associated liquid pump.

Figure 5 shows a gas turbine engine with a fuel system having a booster pump driven by an arrangement in accordance with the invention, Figure 6 shows a modification of the arrangement of Figure 5, and Figure 7 shows another modification of the arrangement of Figure 5.

Referring to Figures 1–3, 5 and 7, a gas-turbine engine is illustrated diagrammatically and is shown as comprising a compressor system 10 delivering compressed air to main combustion equipment 11. The products of combustion on leaving the main combustion equipment 11 pass through a turbine 12 and then through an exhaust duct or jet pipe 13 and a propelling nozzle 14 to atmosphere.

Fuel is supplied to the main combustion equipment 11 by a main fuel supply system including fuel injectors 15 supplied through a fuel manifold 16 from a high-pressure fuel line 17 having connected in it a manually-operated fuel flow control means indicated at 18.

Referring now to Figures 1–3, the fuel is delivered to the fuel line 17 by a main fuel pressurising pump 19 which is mechanically driven by the engine through a mechanical drive indicated diagrammatically at 20. The pump 19 may be of any convenient kind, for instance it may be a positive-displacement fixed-capacity pump or positive-displacement variable-capacity pump, or a centrifugal pump. The fuel is delivered at low pressure to the inlet side of the pump 19, being drawn off from a fuel tank 21 by means of a booster pump 22 of the kind having a centrifugal impeller.

The booster pump 22 in Figures 1–3 is driven by means of a hydraulic motor 23 which is operated by high-pressure fuel tapped off from high-pressure pipe line 17. The tapping is shown as being effected by a pipe line 24 leading from pipe line 17 upstream of the control means 18 to the inlet of the motor 23. The exhaust fuel flow from the motor 23 is returned through pipe line 25 to the fuel tank 21.

Referring again to Figure 1, it will be seen that the engine has only a main fuel supply system and thus the booster pump 22 supplies the main fuel pressurising pump 19 only.

In Figure 2, however, the engine is also provided with an auxiliary fuel supply system for delivering fuel to be burnt in the jet pipe 13, and it is arranged that the booster pump 22 pressurises the inlets of both the main fuel pump 19 and a fuel pressurising pump 28 of the auxiliary fuel supply system. The auxiliary pump 28 is illustrated as a pump of the centrifugal impeller kind, and the pump 28 is driven by means of a hydraulic motor 29 fed through pipe line 30 with high-pressure fuel tapped off from pipe line 17 between the main fuel pressurising pump 19 and control means 18. The pipe line 30 has in it a control cock 31. The fuel exhausting from the hydraulic motor passes through pipe line 32 back to the tank 21. The fuel delivered by the pump 28 passes through pipe line 33 which may include any suitable fuel control means (not shown) to auxiliary fuel injectors 34 in the exhaust duct 13. The fuel fed into the exhaust duct 13 by injectors 34 burns to reheat the exhaust gas flowing in the exhaust duct and augments the propulsive thrust of the engine.

In Figure 3, auxiliary fuel injectors 34 are again provided in the exhaust duct 13 as part of an auxiliary fuel supply system for the purpose of augmenting the propulsive thrust of the engine, and the injectors 34 are fed with fuel through pipe line 35 by a centrifugal pump 36 driven by a hydraulic motor 37. The auxiliary pump 36 draws fuel direct from the fuel tank 21. The hydraulic motor 37 is supplied with high-pressure fuel tapped off from the high-pressure pipe line 17 through pipe line 38 which includes a shut-off cock 39. The exhaust flow from the hydraulic motor 37 passes back to the fuel tank 21 through pipe line 40.

Referring now to Figure 4, there is shown diagrammatically a construction of a centrifugal impeller pump unit which is suitable for attachment to a wall of the fuel tank, and for use in the arrangements of Figures 1–3 and of Figures 5–7 described hereafter. The impeller 50 of the pump is supported on a driving shaft 51 within a casing 52. The fuel enters the pump through the inlet eye 53 and leaves the pump through the delivery volute 54 and delivery pipe 55. The driving shaft 51 is borne in bearings 56 and 57 and the shaft supports a Pelton wheel 58 having buckets 59. High pressure fuel is supplied through a nozzle indicated at 60, the exhaust flow being returned to the fuel tank. The unit is suitable for use where the fluid in the pump is the same as the pressure fuel for operating the motor, since no glands are provided between the casing and the rotor shaft. It will be seen the motor casing communicates with the pump casing through a bearing and thus is connected with the interior of the fuel tank.

In the embodiment just described the fuel pump is suitable for mounting on the outside of the fuel tank; however, the impeller may in certain cases be mounted inside the tank and in this case although the motor may be outside the tank, it is preferred also to arrange the motor within the tank, thereby avoiding the need for glanding for the drive shaft.

In place of a Pelton wheel or hydraulic turbine, a hydraulic motor of the positive-displacement kind such as a gear motor or sliding vane motor may be used and a motor of the positive-displacement kind is preferred especially where the motor is within the tank.

In the construction of Figure 5 the main fuel pressurising pump is a centrifugal pump 19a, driven from the engine through mechanical drive indicated at 20. In this arrangement the booster pump 22 is driven by means of a hydraulic motor 23 which is driven by high-pressure fuel tapped off through pipe line 24 from the high-pressure delivery pipe line 17 of the centrifugal pump 19a, upstream of control means 18. The exhaust fuel flow from motor 23 is returned through pipe line 25 to the fuel tank 21a which is adapted to provide sufficient heat dissipation to prevent the fuel in the tank rising to an excessive temperature, for example by being formed as part of the wing of an aircraft, part of the upper and lower surfaces of the wing forming walls of the fuel tank.

This arrangement has the advantage that not only is the booster pump 22 driven in a desirable manner, but also overheating and possible boiling of the fuel delivered by the engine-driven centrifugal pump is avoided under certain circumstances.

It is known that the quantity of fuel required for combustion in the combustion equipment 11 of the engine is much less at high altitudes than at low altitudes, for a given rotational speed of the engine, but a centrifugal pump tends to deliver a constant quantity of fuel at a constant rotational speed. The centrifugal pump must be chosen so that it will deliver the maximum quantity of fuel required by the engine, and it has been found that throttling such a pump to reduce the quantity of fuel delivered at high altitudes results in heating of the fuel due to recirculation within the pump. This is disadvantageous, and in particular may result in boiling of the fuel, especially where the fuel pressure is reduced due to passing through a restriction, such as a throttle valve, in the delivery pipeline. The present applicants have discovered that the heating of the fuel may be reduced, and boiling prevented, by arranging that the fuel pump delivers a larger quantity of fuel than that required by the engine, the excess being by-passed for example back to the fuel tank. Ideally the excess quantity is greater at high altitudes than at low altitudes, but an advantageous result may be obtained when the excess quantity is the same at any altitude.

The excess may be tapped off from the delivery pipeline 17, as shown in Figure 5, or it may conveniently be tapped off directly from a delivery volute 70 of the centrifugal pump 19a as shown in Figure 6.

The excess fuel may be by-passed back to the fuel tank or to the suction side of the pump, but since the fuel has been heated by passing through the pump it should be suitably cooled before again being led to the pump inlet. This may be achieved by arranging that the fuel mixes with a large volume of cool fuel in the tank, and is thereby cooled by heat exchange with the large volume of fuel, and for this purpose the tank should be suitably cooled, for example, by being formed as part of an aircraft wing as described above.

Alternatively the fuel may be passed through a heat exchanger of any known or convenient kind to be cooled by a flow of air therethrough, due for example to the velocity of the aircraft in which the system is installed, before again passing to the inlet of the main centrifugal pump.

In a preferred arrangement shown in Figure 7 the fuel exhausting from the hydraulic motor 23 is led by a conduit 25a to a heat exchanger 71, where it is cooled by heat exchange relation with an airstream caused by the velocity of the aircraft, and thence through conduit 25b to fuel tank 21a. The heat exchanger 71 is preferably of the recuperative type, that is one in which the two fluid streams are in steady flow through separate channels, heat being transferred from one to the other through a fixed dividing wall, or walls.

In the arrangements of Figures 5 and 7, the hydraulic motor serves to restrict the quantity of fuel by-passed through conduits 24, 25, and the characteristics of the hydraulic motor may be chosen so as to regulate this quantity of fuel in a desired manner.

We claim:

1. A gas-turbine engine including a compressor, main combustion equipment to which air is delivered by said compressor, main fuel injectors in said main combustion equipment and a turbine to receive the combustion products therefrom and connected to said compressor to drive it, a fuel source, a main fuel pump driven by the engine for delivering from said fuel source a quantity of fuel in excess of that required by said injectors, a first conduit connected to the delivery of said main pump and connected to said main injectors, an auxiliary fuel pump at the fuel source, said auxiliary fuel pump having its inlet supplied with fuel from said source and having its outlet connected to deliver fuel to the inlet of said main fuel pump, a hydraulic motor connected to said auxiliary pump to drive it, and a second conduit connected to the delivery of said main pump for tapping off the excess of quantity of fuel delivered by said main fuel pump and connected to the inlet of said hydraulic motor whereby said hydraulic motor is driven by said excess quantity of fuel delivered by the main fuel pump.

2. A gas-turbine engine which includes a compressor, main combustion equipment to which air is delivered by said compressor, main fuel injectors in said main combustion equipment and a turbine to receive the combustion products therefrom and connected to said compressor to drive it, a fuel source, a booster pump at the fuel source said booster pump being connected to receive fuel from said source, a main fuel pump driven by the engine for delivering from said fuel source a quantity of fuel in excess of that required by said injectors and having its inlet connected to the outlet of said booster pump to receive fuel therefrom, the booster pump being arranged to overcome losses occurring between itself and the main fuel pump, a first conduit connected to the delivery of said main pump and connected to said main fuel injectors, a hydraulic motor connected to said booster pump to drive it, and a second conduit connected to the delivery of said main pump for tapping off the excess quantity of fuel delivered by said main fuel pump and connected to the inlet of said hydraulic motor whereby said hydraulic motor is driven by said excess quantity of fuel delivered by the main fuel pump.

3. A gas-turbine engine comprising a compressor, main combustion equipment to which air is delivered by said compressor, main fuel injectors in said main combustion equipment, a turbine to receive the combustion products therefrom and connected to said compressor to drive it, reheat combustion equipment downstream of said turbine and reheat fuel injectors in said reheat combustion equipment, a fuel source, an auxiliary fuel pump at the fuel source, said auxiliary fuel pump having its inlet supplied with fuel from the fuel source, a main fuel pump driven by the engine for delivering from said fuel source a quantity of fuel in excess of that required by said main fuel injectors, a first conduit connecting the delivery of the auxiliary fuel pump with the inlet of the main fuel pump, a second conduit connected to the delivery of said main pump and connected to said main injectors, a first hydraulic motor connected to drive said auxiliary fuel pump, a third conduit connected to the delivery of said main fuel pump for tapping off a portion of said excess quantity of fuel and connected to the inlet of the first hydraulic motor whereby it is operated by fuel delivered by the main fuel pump, a reheat fuel source, a reheat fuel pump having its inlet connected to receive fuel from said reheat fuel source, a delivery connection from said reheat fuel pump to said reheat fuel injectors, a second hydraulic motor connected to said reheat fuel pump to drive it, and a fourth conduit connected to the delivery of said main fuel pump for tapping off another portion of said excess quantity of fuel and connected to the inlet of said second hydraulic motor whereby said second hydraulic motor is driven by said another of said excess quantity of fuel delivered by the main fuel pump.

4. A gas-turbine engine which includes a compressor, main combustion equipment to which air is delivered by said compressor, main fuel injectors in said main combustion equipment and a turbine to receive the combustion products therefrom and connected to said compressor to drive it, a fuel source, a centrifugal fuel pump driven by the engine for delivering from said fuel source a quantity of fuel in excess of that required by said fuel injectors, an auxiliary fuel pump at said fuel source, said auxiliary fuel pump having its inlet connected to be supplied with fuel from said fuel source, a first conduit connecting the delivery of the auxiliary fuel pump to the inlet of the centrifugal pump, a second conduit connected to the delivery of said centrifugal pump and connected to said main fuel injectors, heat exchanger means adapted to reduce the temperature of fuel conveyed thereto, an hydraulic motor connected to drive the auxiliary fuel pump, a third conduit connected to the delivery of said centrifugal pump, said hydraulic motor and said heat exchanger means being connected in said third conduit in flow series arrangement, whereby part only of the fuel delivered by the centrifugal pump is delivered to said main injectors, and a second part consisting of said excess quantity of fuel is conveyed to said hydraulic motor to operate it and to said heat exchanger means to be cooled, said third conduit being connected at its downstream end to return the fuel flowing therein to said fuel source.

5. A gas-turbine engine which includes a compressor, main combustion equipment to which air is delivered by said compressor, main fuel injectors in said main combustion equipment and a turbine to receive the combustion products therefrom and connected to said compressor to drive it, a fuel source, a centrifugal pump driven by the engine for delivering from said fuel source a quantity of fuel in excess of that required by said injectors, an auxiliary fuel pump at said fuel source, said auxiliary fuel pump having its inlet connected to be supplied with fuel from said fuel source, a first conduit connecting the delivery of the auxiliary fuel pump to the inlet of the centrifugal pump, a second conduit connecting the delivery of said centrifugal pump to said main fuel injectors, a fuel tank wherein the temperature of heated fuel conveyed thereto is reduced by heat loss to the surrounding atmosphere, a third conduit connecting the delivery of said centrifugal pump to said fuel tank to convey said excess quantity of fuel thereto, an hydraulic motor connected to drive said auxiliary fuel pump and connected in the third conduit to be operated by said excess quantity of fuel flowing in the third conduit and to prevent free flow of fuel in said third conduit whereby part only of the fuel delivered by said centrifugal pump is delivered to said main fuel injectors and the remainder is conveyed to said fuel tank.

6. A gas-turbine engine including a compressor, main combustion equipment to which air is delivered by said compressor, main fuel injectors in said main combustion equipment and a turbine to receive the combustion products therefrom and connected to said compressor to drive it, a fuel source, a main fuel pump driven by the engine for delivering from said fuel source a quantity of fuel in excess of that required by said injectors, an auxiliary fuel pump for delivering fuel from the fuel source to the inlet side of said main fuel pump, a hydraulic motor connected to said auxiliary pump to drive it, and conduit means for tapping off the excess quantity of fuel delivered by said main fuel pump and delivering it to the inlet side of said hydraulic motor for operating it.

7. A gas turbine engine as claimed in claim 6, wherein conduit means interconnect the outlet of said hydraulic motor and said fuel source whereby the fuel which drives the hydraulic motor is returned to said fuel source.

References Cited in the file of this patent

UNITED STATES PATENTS

| | | |
|---|---|---|
| 2,116,337 | Broeze et al. | May 3, 1938 |
| 2,238,502 | Muir et al. | Apr. 15, 1941 |
| 2,263,864 | Avigdor | Nov. 25, 1941 |
| 2,502,241 | Yates | Mar. 28, 1950 |
| 2,506,611 | Neal et al. | May 9, 1950 |
| 2,520,967 | Schmitt | Sept. 5, 1950 |
| 2,566,373 | Redding | Sept. 4, 1951 |
| 2,640,316 | Neal | June 2, 1953 |
| 2,679,206 | Huber | May 25, 1954 |
| 2,720,256 | Pearson | Oct. 11, 1955 |

FOREIGN PATENTS

| | | |
|---|---|---|
| 614,341 | Great Britain | Dec. 14, 1948 |